(12) United States Patent
Fujibayashi et al.

(10) Patent No.: US 6,922,840 B2
(45) Date of Patent: Jul. 26, 2005

(54) RECORDING MEDIUM DRIVING APPARATUS INCLUDING AT LEAST A TURNTABLE, A SPINDLE MOTOR, AND A LINEAR DRIVING DEVICE

(75) Inventors: Shigeki Fujibayashi, Tokyo (JP); Hideyuki Takagi, Shizuoka (JP); Tomoyasu Takaoka, Saitama (JP); Isao Okuyama, Chiba (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 10/415,307

(22) PCT Filed: Aug. 29, 2002

(86) PCT No.: PCT/JP02/08751
§ 371 (c)(1),
(2), (4) Date: Apr. 28, 2003

(87) PCT Pub. No.: WO03/030169
PCT Pub. Date: Apr. 10, 2003

(65) Prior Publication Data
US 2004/0008609 A1 Jan. 15, 2004

(51) Int. Cl.$^7$ .............................................. G11B 21/02
(52) U.S. Cl. ..................... 720/675; 369/249.1
(58) Field of Search ................ 720/675, 676; 369/249.1, 236, 259, 244.1, 219.1, 44.16, 249, 219; 360/266.1, 267.1

(56) References Cited

U.S. PATENT DOCUMENTS

| | | | |
|---|---|---|---|
| 5,995,479 A | * 11/1999 | Takizawa et al. | ........... 720/675 |
| 6,285,649 B1 | 9/2001 | Bessho et al. | |
| 6,298,031 B1 | * 10/2001 | Morita et al. | ............... 720/675 |
| 6,356,525 B1 | * 3/2002 | Ikedo et al. | ................ 720/675 |
| 6,385,160 B1 | * 5/2002 | Jeon | .......................... 720/675 |
| 6,414,934 B1 | * 7/2002 | Akiba | ........................ 720/675 |
| 6,567,362 B1 | * 5/2003 | Kagaya et al. | .............. 720/675 |
| 6,667,945 B2 | * 12/2003 | Omori | ........................ 720/681 |
| 6,795,971 B2 | * 9/2004 | Lin | ............................ 720/679 |

FOREIGN PATENT DOCUMENTS

| | | |
|---|---|---|
| CN | 1244002 | 2/2000 |
| EP | 0 978 825 | 2/2000 |
| JP | 54-156957 | 12/1979 |
| JP | 3-130971 | 6/1991 |
| JP | 6-338151 | 12/1994 |
| JP | 9-204667 | 8/1997 |
| JP | 11-297010 | 10/1999 |
| JP | 2000-57715 | 2/2000 |
| JP | 2001-67699 | 3/2001 |
| JP | 2001307436 | * 11/2001 |

* cited by examiner

Primary Examiner—Angel Castro
(74) Attorney, Agent, or Firm—Frommer Lawrence & Haug LLP; William S. Frommer

(57) ABSTRACT

A recording medium driving apparatus can adjust the position of a linear driving means with respect to a turntable with high precision, so that a direction in which the head apparatus is moved by the linear driving means matches a predetermined radial direction with respect to a rotational center axis of the turntable. The recording medium driving apparatus includes a chassis 70, a rotating plate 63 that is rotatably provided on the chassis 70, a rotational center determining means 61 that determines the rotational center of the rotating plate 63 with respect to the chassis 70, and a rotational driving means 62 for rotating the rotating plate 63 around the rotational center. At least part of the linear driving means is fixed on the rotating plate 63 and the rotation of the rotating plate 63 by the rotational driving means 62 adjusts the direction in which the head apparatus 22 is moved by the linear driving means so as to match a predetermined radial direction with respect to a rotational center axis of the turntable 26.

6 Claims, 15 Drawing Sheets

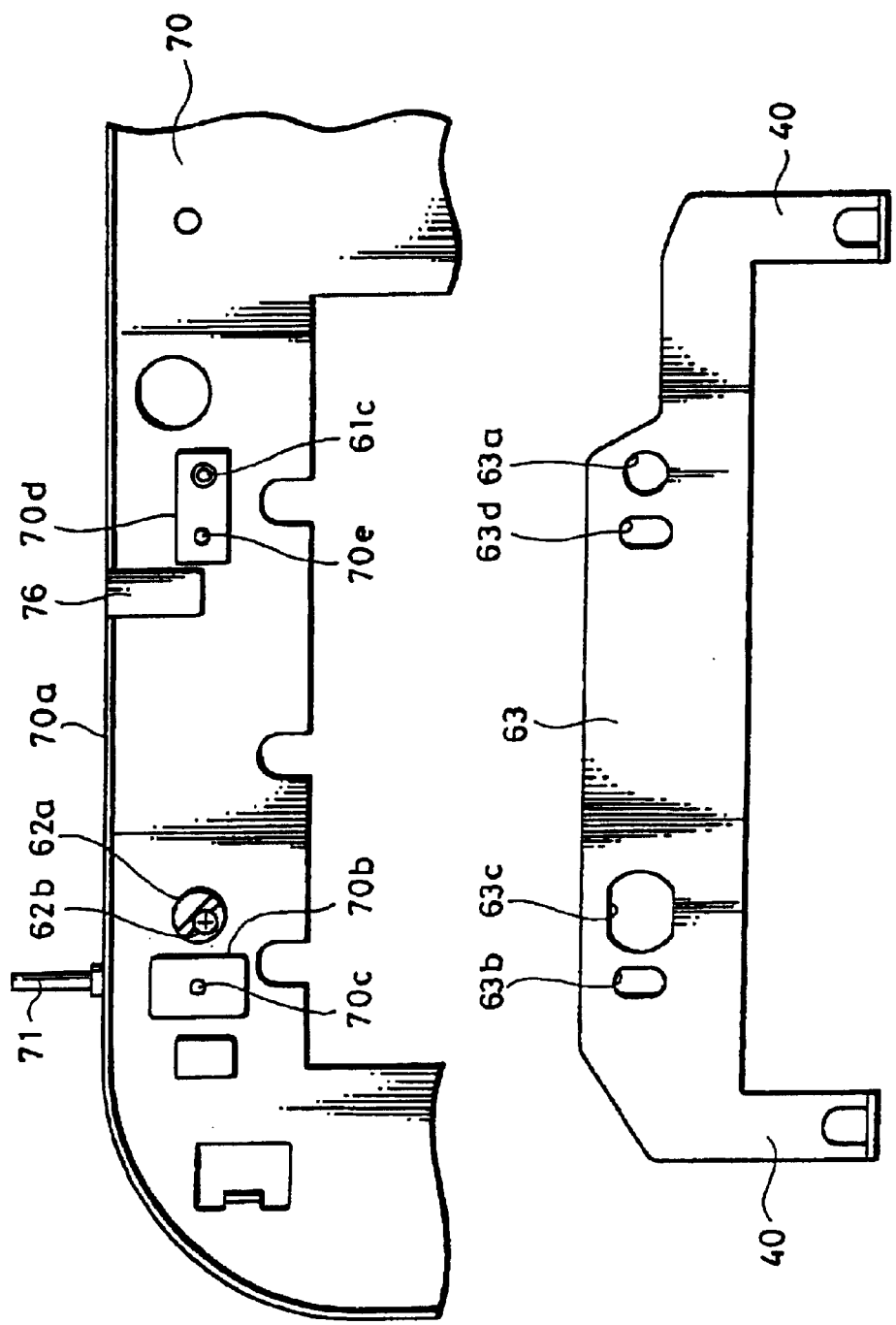

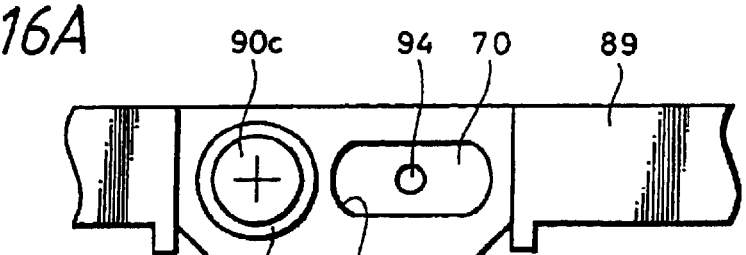
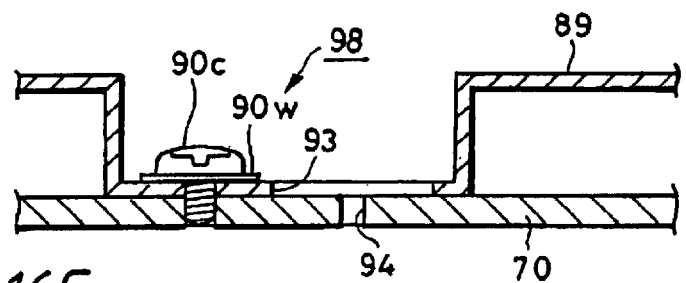
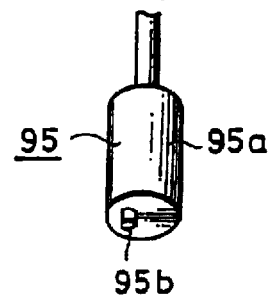
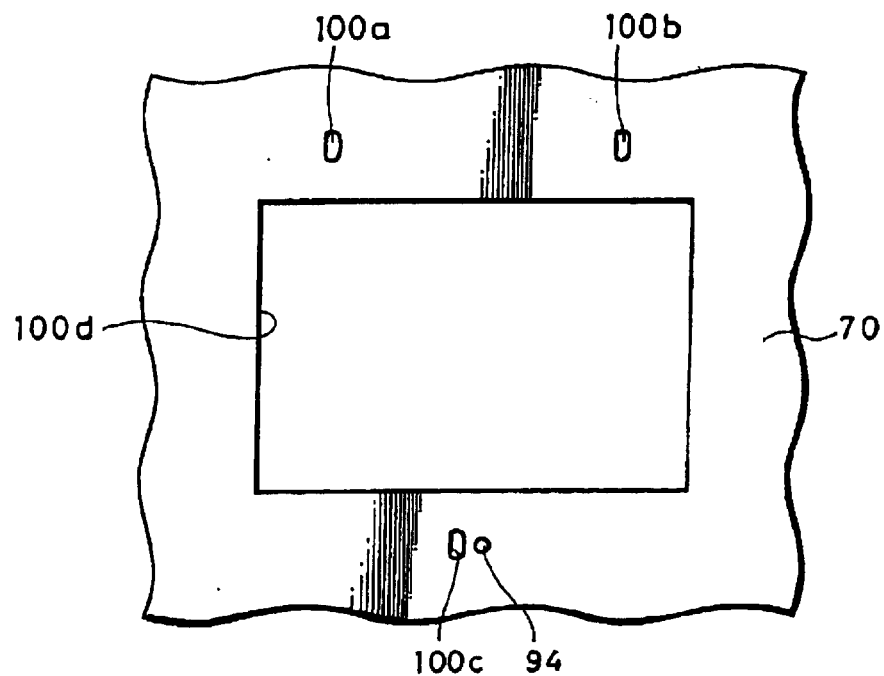

RECORDING MEDIUM DRIVING APPARATUS INCLUDING AT LEAST A TURNTABLE, A SPINDLE MOTOR, AND A LINEAR DRIVING DEVICE

TECHNICAL FIELD

The present invention relates to a recording medium driving apparatus, such as an optical disc driving apparatus.

BACKGROUND ART

A variety of optical disc driving apparatuses have been proposed for driving optical discs such as CDs (Compact Discs) and DVDs (Digital Versatile Discs).

The inventors of the present invention have conceived an optical disc driving apparatus that includes at least a turntable for rotationally driving an optical disc that has been loaded, a spindle motor for driving this turntable, an optical head apparatus, and a linear driving means for linearly driving this optical head apparatus.

DISCLOSURE OF THE INVENTION

In view of the above problems, the present invention proposes a recording medium driving apparatus that includes at least a turntable for rotationally driving a recording medium that has been mounted, a spindle motor for driving the turntable, a head apparatus for performing recording and/or reproduction for the recording medium, and linear driving means for moving the head apparatus in a straight line, wherein the position of the linear driving means with respect to the turntable can be adjusted with high precision so that a direction in which the head apparatus is moved by the linear driving means matches a predetermined radial direction with respect to a rotational center axis of the turntable.

The present invention also proposes a recording medium driving apparatus which includes at least a turntable for rotationally driving a recording medium that has been mounted, a spindle motor for driving the turntable, a head apparatus for performing recording and/or reproduction for the recording medium, and linear driving means for moving the head apparatus in a straight line, wherein the position of the linear driving means with respect to the turntable can be easily adjusted by a simple construction so that a direction in which the head apparatus is moved by the linear driving means matches a predetermined radial direction with respect to a rotational center axis of the turntable.

The present invention is a recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus further including: a chassis; a rotating plate that is rotatably disposed on the chassis; rotational center determining means for determining a rotational center of the rotating plate with respect to the chassis; and rotational driving means for driving the rotating plate around the rotational center, wherein at least part of the linear driving means is fixed to the rotating plate, and the rotational driving means rotates the rotating plate so that a direction in which the head apparatus is moved by the linear driving means is adjusted to match a predetermined radial direction with respect to a rotational center axis of the turntable.

With the present invention, a rotating plate is rotatably provided on the chassis. The rotational center determining means determines the rotational center of the rotating plate with respect to the chassis, and the rotational driving means has the rotating plate rotate around the rotational center. At least part of the linear driving means is fixed onto the rotating plate, and the rotation of the rotating plate by the rotational driving means has the direction in which the head apparatus is moved by the linear driving means adjusted to match a predetermined radial direction with respect to a rotational center axis of the turntable.

The present invention is also a recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus further including: a chassis; a moving body on which the head apparatus and the linear driving means are mounted, the moving body being screwed onto the chassis in a movable state so that a direction in which the head apparatus is moved by the linear driving means becomes parallel with a predetermined radial direction with respect to a rotational center axis of the turntable; and parallel driving means for driving, in concert with a jig and with respect to the chassis, the moving body parallel with respect to a predetermined radial direction with respect to a rotational center axis of the turntable, wherein parallel movement of the moving body by the parallel driving means adjusts a direction in which the head apparatus is moved by the linear driving means so as to match the predetermined radial direction with respect to the rotational center axis of the turntable.

BRIEF DESCRIPTION OF DRAWINGS

FIGS. 8A and 8B are respectively a plan view showing part of the chassis of the recording medium driving apparatus shown in FIGS. 1 and 2 and a rotating plate that is related to this part of the chassis.

FIG. 16A is a partially enlarged plan view of the recording medium driving apparatus of FIG. 1.

FIG. 16B is a partially enlarged cross-sectional view of the recording medium driving apparatus of FIG. 1.

FIG. 16C is a perspective view showing part of an eccentric driver.

FIG. 17 is a plan view showing part of the chassis that is related to part of the part of the recording medium driving apparatus shown in FIG. 12.

BEST MODE FOR CARRYING OUT THE INVENTION

The following describes, with reference to the enclosed drawings, an optical disc driving apparatus as one example of a recording medium driving apparatus according to the present invention.

Figure 1:
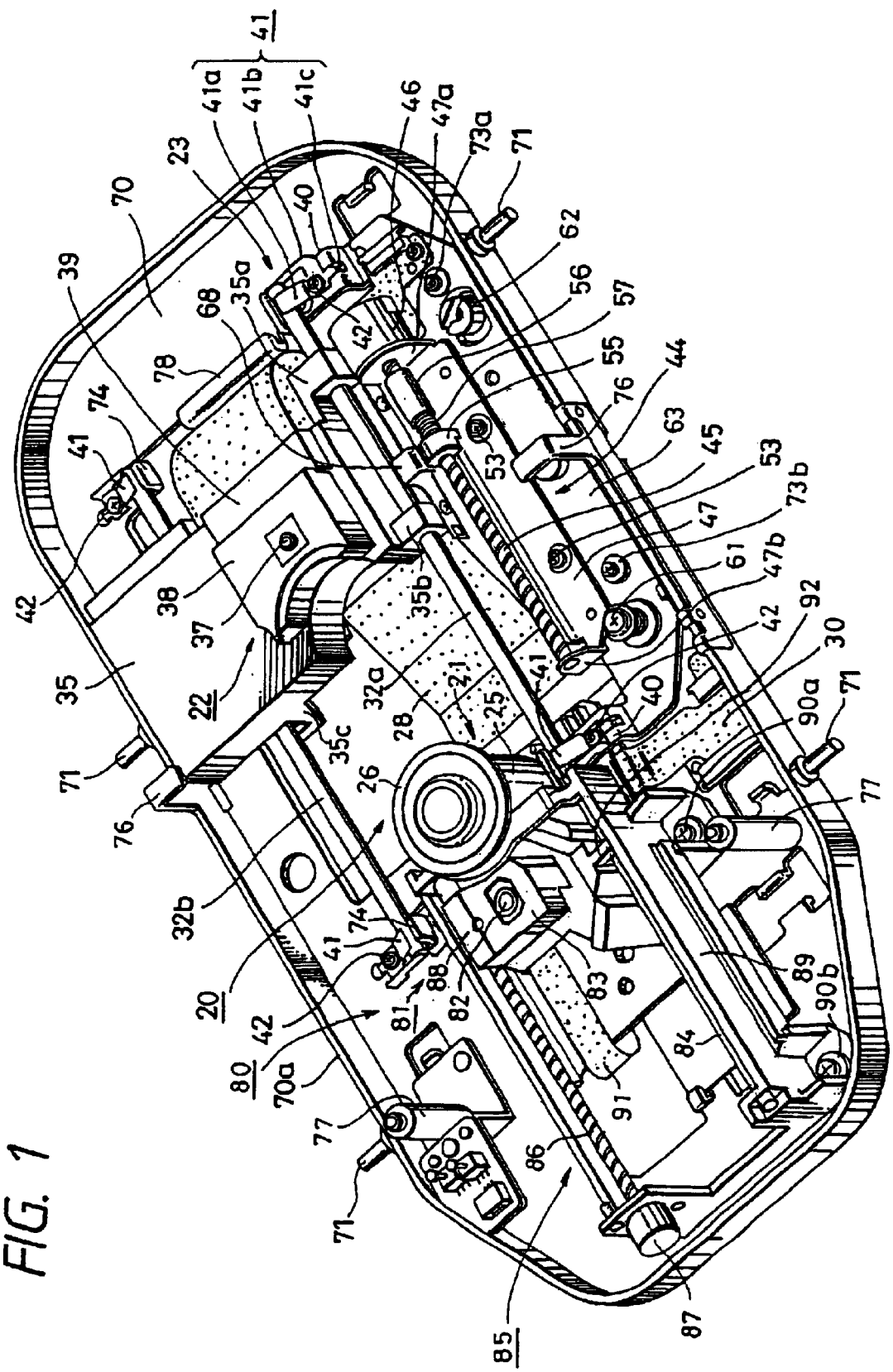
FIG. 1 is a perspective view showing one example of a recording medium driving apparatus according to an embodiment of the present invention.
Figure 2:
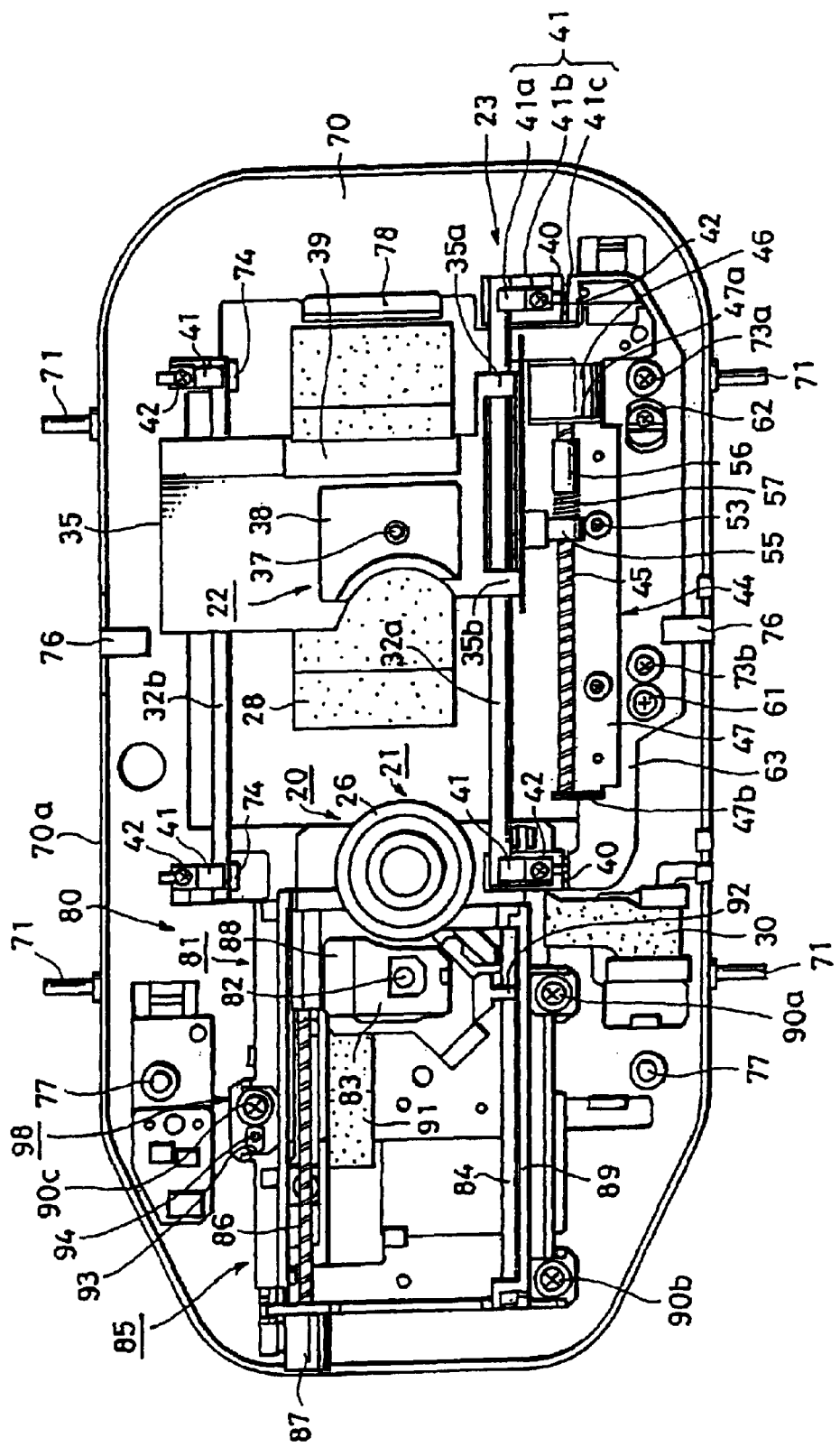
FIG. 2 is a plan view showing one example of a recording medium driving apparatus according to an embodiment of the present invention.

FIGS. 1 and 2 are respectively a perspective view and a plan view that show the overall construction of this optical disc driving apparatus that will be described below. In the drawings, reference numeral 70 denotes a metal chassis. A reinforcing rib 70a is integrally formed with the chassis 70 around the edge of the chassis 70.

In FIGS. 1 and 2, reference numeral 20 denotes the entire disc driving apparatus, which includes: a table driving apparatus 21 that rotationally drives an optical disc at a predetermined speed (for example, a constant linear speed); a first optical head apparatus 22 that performs reads and writes of information signals such as image data and audio data; a second optical head apparatus 81 that performs reads of information signals such as image data and audio data; an optical head driving apparatus (linear driving means) 23 that moves the first optical head apparatus 22 back and forth in a straight line relative to the table driving apparatus 21, and an optical head driving apparatus (linear driving means) 80 that moves the second optical head apparatus 81 back and forth in a straight line relative to the table driving apparatus 21.

The table driving apparatus 21 includes a spindle motor 25, a turntable 26 that is fixed to an end part of a rotational shaft of the spindle motor 25, and a chucking plate or the like (not shown in the drawing) that holds the optical disc onto the turntable 26. The spindle motor 25 is attached to an upper surface of a motor baseplate (not shown in the drawing) that is made of a thin metal plate. A flexible circuit board 28 is also fixed to the upper surface of this motor baseplate by a fixing means, such as adhesive. This motor baseplate is attached on the chassis 70.

When part of the flexible circuit board 28 extends below the chassis 70 through a hole provided in the chassis 70, to avoid damage to the flexible circuit board 28 caused by the flexible circuit board 28 coming into the contact with the right-angled parts of the edges of the hole, the edges of the hole in the chassis 70 are partially bent, to form a bent part 78 so that the flexible circuit board 28 instead comes into contact with the curved surface of such bent part 78.

The spindle motor 25 has a fixed part that is fixed to the motor baseplate and a rotating part that is supported by the fixed part so as to be freely rotatable. The turntable 26 is fitted onto the rotational shaft that is the center of rotation of the rotating part by a fixing means, such as insertion under pressure and so is integrated with the spindle motor 25.

The first and second optical head apparatuses 22 and 81 are provided on the chassis 70 on both sides of the table driving apparatus 21. In this case, the first optical head apparatus 22 is an optical head apparatus that can optically write and read data such as image data and audio data on a recordable disc (called a "DVR", for example), and uses a red laser diode as a laser light source. Such DVR is enclosed in a cartridge which is supported by a pair of cartridge supporting members 76, 76 that are integrally formed with the reinforcing rib 70a and a pair of cartridge supporting members 77 that extend upwards from the chassis 70, with the disc itself being mounted on the turntable 26.

The second optical head apparatus 81 is an optical head apparatus that can optically reproduce data such as image data and audio data from optical discs that satisfy the DVD (Digital Versatile Disc) and CD (Compact Disc) standards. As a laser light source for such reads, the second optical head apparatus 81 uses a red and/or infrared laser diode.

First, the first optical head apparatus 22 and various related means will be described. A pair of guide shafts (a main and sub guide shaft) 32a, 32b are formed on both sides of the spindle motor 25 and are disposed approximately parallel to one another. This pair of guide shafts 32a, 32b is formed of cylindrical members whose outer circumferential surfaces are smooth. The main guide shaft 32a is supported at both ends by a shaft (see FIGS. 11, 13, and 15) that will be described later, with the height of the main guide shaft 32a being adjusted. The sub guide shaft 32b is supported at both ends by a set screw 60 (see FIGS. 12 and 14) that will be described later, with the height of the sub guide shaft 32b also being adjusted.

A rotating plate 63 is screwed onto the chassis 70 by screws 73a, 73b, and can be rotated by a minute angle by a rotational driving means 62, which will be described later, about a rotational center determining means 61, which will also be described later. By rotating this rotating plate 63 the direction of movement of the first optical head apparatus 22 by a linear driving means can be adjusted so as to match a predetermined radial direction with respect to the rotational center of the turntable 26.

A straight line that joins the rotational center determining means 61 and the rotational driving means 62 is approximately parallel to the predetermined radial direction for the rotational center of the turntable 26. The rotational center determining means 61 is attached to the rotating plate 63 and the chassis 70 so that the rotational center determining means 61 is located at a predetermined position close to the turntable 26. The rotational driving means 62 is attached to the rotating plate 63 so that the rotational driving means 62 is located at a predetermined position far from the turntable 26. The range of the rotational angle and precision of the rotational angle of the rotating plate 63 due to the rotation of the rotational driving means 62 are determined according to the positions of and distance between the rotational center determining means 61 and the rotational driving means 62.

The first optical head apparatus 22 is supported by this pair of guide shafts 32a, 32b so that the first optical head apparatus 22 can move back and forth in a straight line so as to move closer to and further away from the turntable 26. One end of each of the guide shafts 32a, 32b is supported by both sides of the spindle motor 25, while the other ends of the guide shafts 32a, 32b extend away from the spindle motor 25 so that the guide shafts 32a, 32b are approximately parallel.

The first optical head apparatus 22 is attached on a slide member 35 that is guided by the pair of guide shafts 32a, 32b, and is moved reciprocally. The slide member 35 is large enough to straddle the pair of guide shafts 32a, 32b, and is formed in the shape of a block to improve its rigidity. On one side of the slide member 35 in the longitudinal direction, shaft bearings 35a, 35b that form a pair are provided in a width direction that is perpendicular to the longitudinal direction. The main guide shaft 32a is inserted through these shaft bearings 35a, 35b so as to be freely slidable.

An L-shaped sliding engagement hook 35c, through which the sub guide shaft 32b is inserted so as to be freely slidable, is provided on the other side of the next instruction pointer generating unit 35 in the longitudinal direction. In addition, the sliding engagement hook 35c is formed so as to be wide in the horizontal direction and so is constructed so that the sub guide shaft 32b can be slightly tilted with respect to the width direction of the slide member 35. Accordingly, even when the pair of guide shafts 32a, 32b are not parallel and so are aligned at a slight angle to one another, the slide member 35 can still slide smoothly guided by the main guide shaft 32a.

The sub guide shaft 32b is suspended between a pair of shaft suspending arms 74, 74 that are provided on the chassis 70, with both ends of the sub guide shaft 32b being fixed and positioned at a predetermined position by pressure applied by shaft pressing plates 41 composed of plate springs. Each shaft suspending arm 74 is formed by bending upwards part of the chassis 70, and by screwing the shaft pressing plates 41 directly onto the chassis 70, the sub guide shaft 32b can be fixed and positioned at a predetermined position on the chassis 70.

The first optical head apparatus 22 is composed of a biaxial actuator, which including an objective lens 37, and an optical control unit, which includes a photoelectric conversion element or the like and a laser diode for recording and reproducing information signals such as image data and audio data via the biaxial actuator. The majority of the biaxial actuator is covered by a head cover 38, with the objective lens 37 exposed via an opening provided in the head cover 38. The objective lens 37 of the first optical head apparatus 22 faces an information recording surface of the optical disc loaded on the turntable 26. An optical head connector 39 that is attached to an upper surface of the slide member 35 is electrically connected to the optical control unit. The flexible circuit board 28 mentioned above is connected to this connector 39.

Of the pair of guide shafts 32a, 32b, the main guide shaft 32a is supported by a pair of shaft supporting plates 40, 40 that are provided on the rotating plate 63. These shaft supporting plates 40, 40 project from the main part of the rotating plate 63 like arms. The rotating plate 63 is formed from a long, slender, plate-like material made of a metal plate has approximately the same length as the main guide shaft 32a. At both ends of the rotating plate 63 in the longitudinal direction, the shaft supporting plates 40, 40 are provided so as to project upwards on one side in the width direction that is perpendicular to the longitudinal direction. Each of the shaft supporting plates 40, 40 has a base part that is bent in the shape of a crank and has an end that is raised upwards. As a result, L-shaped shaft supporting parts that are raised to a predetermined height from the support surface are formed at the free ends of the shaft supporting plates 40, 40.

Both ends of the main guide shaft 32a are mounted upon and positioned by these shaft supporting parts of the pair of shaft supporting plates 40, 40 that have the shape described above. Both ends of the first guide shaft 32a are pressed upon and fixed by shaft pressing plates 41 that are screwed onto the shaft support parts 40a using fixing screws 42. Each shaft pressing plate 41 includes a pressing plate 41a that presses an end of the first guide shaft 32a in a radial direction, a stopper plate 41b that is in contact with the end of the first guide shaft 32a and stops the first guide shaft 32a from moving in the axial direction, and an engaging plate 41c that stops rotational displacement of the shaft pressing plate 41. Each shaft pressing plate 41 is formed of a plate spring that has an appropriate degree of elasticity.

A through-hole through which a fixing screw 42 passes is provided in approximately the center of each shaft pressing plate 41, with the pressing plate 41a being disposed on both sides of the through-hole so as to project outwards in one direction, and the engaging plate 41c being disposed so as to project outwards in another direction. A stopper plate 41b is disposed in approximately the center of each shaft pressing plate 41 so as to project in a direction that is perpendicular to a direction in which the pressing plate 41a and the engaging plate 41c are joined. The end of the stopper plate 41b is bent so as to project on the pressing plate 41a side, with the tip being bent upwards so as to contact the end surface of the main guide shaft 32a. The engaging plate 41c engages a concave part provided in a shaft support plate 40, so that the shaft pressing plate 41 does not rotate, even when a large force acts on the stopper plate 41b from the main guide shaft 32a.

The rotating plate 63 that has the construction described above is attached to the chassis 70 so as to be freely rotatable. The sub guide shaft 32b is directly attached to the pair of shaft pressing plates 41 provided in the chassis 70 using the pair of shaft pressing plates (plate springs) 41, 41 that are screwed onto the chassis using the fixing screws 42, 42.

The following describes a feed screw driving apparatus 44 that is attached to the rotating plate 63. This feed screw driving apparatus 44 includes a feed screw 45, a feed motor 46, a support plate 47, and a feed nut (described later) as a power transmission member. The support plate 47 is attached to the rotating plate 63 by screws 53, 53. The feed screw 45 is formed by providing a single screw thread that extends in a spiral across approximately the entire length in the axial direction of the outer circumferential surface of a round bar that is slightly shorter than the pair of guide shafts 32a, 32b. The screw thread in the feed screw 45 should favorably be formed with a trapezoidal cross-section where both side surfaces of the thread are angled slightly, though a square thread that is square in cross-section may also be used. A semicircular screw thread with a semicircular cross-section may also be used, as may any other conventional form of screw thread. In the present embodiment, the feed screw 45 is formed as a right-hand screw, though it should be obvious that a left-hand screw may be used.

The feed screw 45 doubles as the rotational shaft of the feed motor (electric motor) 46 that is the driving source, and is rotationally driven directly by the feed motor 46. The case of the feed motor 46 is fixed to and integrally formed with a motor support plate of the support plate 47 by a fixing means, such as crimping.

The feed nut, which represents a specific example of the power transmission member mentioned above, converts the rotational force of the feed screw 45 into linear motion that is transmitted to the slide member 35, and is composed of a first nut member 55 and a second nut member 56. A coil spring 57, which is an elastic body in the form of a coil and is a specific example of an elastic member, is present between the first nut member 55 and the second nut member 56. The spring force of the coil spring 57 energizes the nut members 55, 56 in opposite directions, and so absorbs any play in the axial direction that is produced between the feed nut (the first number member) 55 and the feed screw 45.

A protrusion bearing member 68 that is fixed to the slide member 35 engages a driving protrusion (not shown in the drawing) formed on the first nut member 55, with the locomotive force of the feed nut (the first nut member) 55 being transmitted via this protrusion bearing member 68 to the slide member 35.

Stainless steel plate is one example of a favorable material for the rotating plate 63 and the support plate 47, though it should be obvious that metal plates aside from steel plate may be used, as may an engineering plastic of sufficient strength. A metal material, such as stainless steel, that is rustproof and has sufficient strength is favorably used as the material for the feed screw 45. As one example, stainless steel with a certain degree of elasticity can be used as a favorable material for the protrusion bearing member 68, though other plate-like materials may also be used.

The pair of guide shafts 32a, 32b described above, the rotating plate 63, and the feed screw driving apparatus 44 compose an optical head driving apparatus 23 that moves the first optical head apparatus 22 on a straight line towards and away from the turntable 26.

The following describes, with reference to FIGS. 1 and 2, the second optical head apparatus 81 and the various means that are related to the second optical head apparatus 81. Reference numeral 89 is an optical head attaching member (constructed of a plastic member, for example), with this optical head attaching member 89 being attached to the chassis 70 by attaching screws 90a, 90b, and 90c, though, by moving this optical head attaching member 89 slightly with respect to the chassis 70, the direction in which the second optical head apparatus 81 is moved by a linear driving means (described later) can be adjusted so as to match a predetermined radial direction with respect to the central rotational axis of the turntable 26.

The second optical head apparatus 81 shares the table driving apparatus 21 that was described with reference to the first optical head apparatus 22. A guide shaft 84 and a feed screw 86 are disposed approximately parallel on each side of the spindle motor 25 of the table driving apparatus 21, with the second optical head apparatus 81 attached on an optical head attaching member 89. The guide shaft 84 is formed of a cylindrical member whose outer circumferential surface is smooth. The feed screw 86 doubles as the rotational shaft of a feed motor (electric motor) 87 that is the driving source, and is rotationally driven directly by the feed motor 87. The feed screw 86 is formed by providing a single screw thread that extends in a spiral across approximately the entire length in the axial direction of the outer circumferential surface of a round bar that is slightly shorter than the pair of guide shafts 32a, 32b. The screw thread in the feed screw 86 should favorably be formed with a trapezoidal cross-section where both side surfaces of the thread are angled slightly, though a square thread that is square in cross-section may also be used. A semicircular screw thread with a semicircular cross-section may also be used, as may any other conventional form of screw thread. In the present embodiment, the feed screw 86 is formed as a right-hand screw, though it should be obvious that a left-hand screw may be used.

The second optical head apparatus 81 is composed of a biaxial actuator, which including an objective lens 82, and an optical control unit, which includes a photoelectric conversion element or the like and a laser diode for recording and reproducing information signals such as image data and audio data via the biaxial actuator. The majority of the biaxial actuator is cover by a head cover 83, with the objective lens 82 of the second optical head apparatus 81 exposed via an opening provided in the head cover 83. The objective lens 82 of the first optical head apparatus 82 faces an information recording surface of the optical disc loaded on the turntable 26.

The second optical head apparatus 81 is supported by the guide shaft 84, the feed screw 86 so that the second optical head apparatus 81 can be moved towards and away from the turntable 26 by the feed motor 87 that drives the feed screw 86. This is to say, a nut 88 is attached to the second optical head apparatus 81, with the nut 88 being screwed onto the feed screw 86. A slide 92 that can slide on the guide shaft 84 is also attached to the second optical head apparatus 81. The second optical head apparatus 81 is connected to a flexible circuit board 91 that is used for reading the reproduction data, etc.

The optical head attaching member 89 is screwed onto the chassis 70 by screws 90a, 90b so as to be rotatable, so that the direction in which the second optical head apparatus 81 is moved by the linear driving means can be made parallel to a predetermined radial direction with respect to the center of rotation of the turntable 26. The optical head attaching member 89 is provided with a parallel driving means that drives the optical head attaching member 89 with respect to the chassis 70 parallel to a predetermined radial direction for the central rotational axis of the turntable 26. By having the optical head attaching member 89 moved in parallel by parallel driving means, the direction in which the second optical head apparatus 81 is moved by the linear driving means can be adjusted so as to match a predetermined radial direction for the central rotational axis of the turntable 26.

Figure 3:
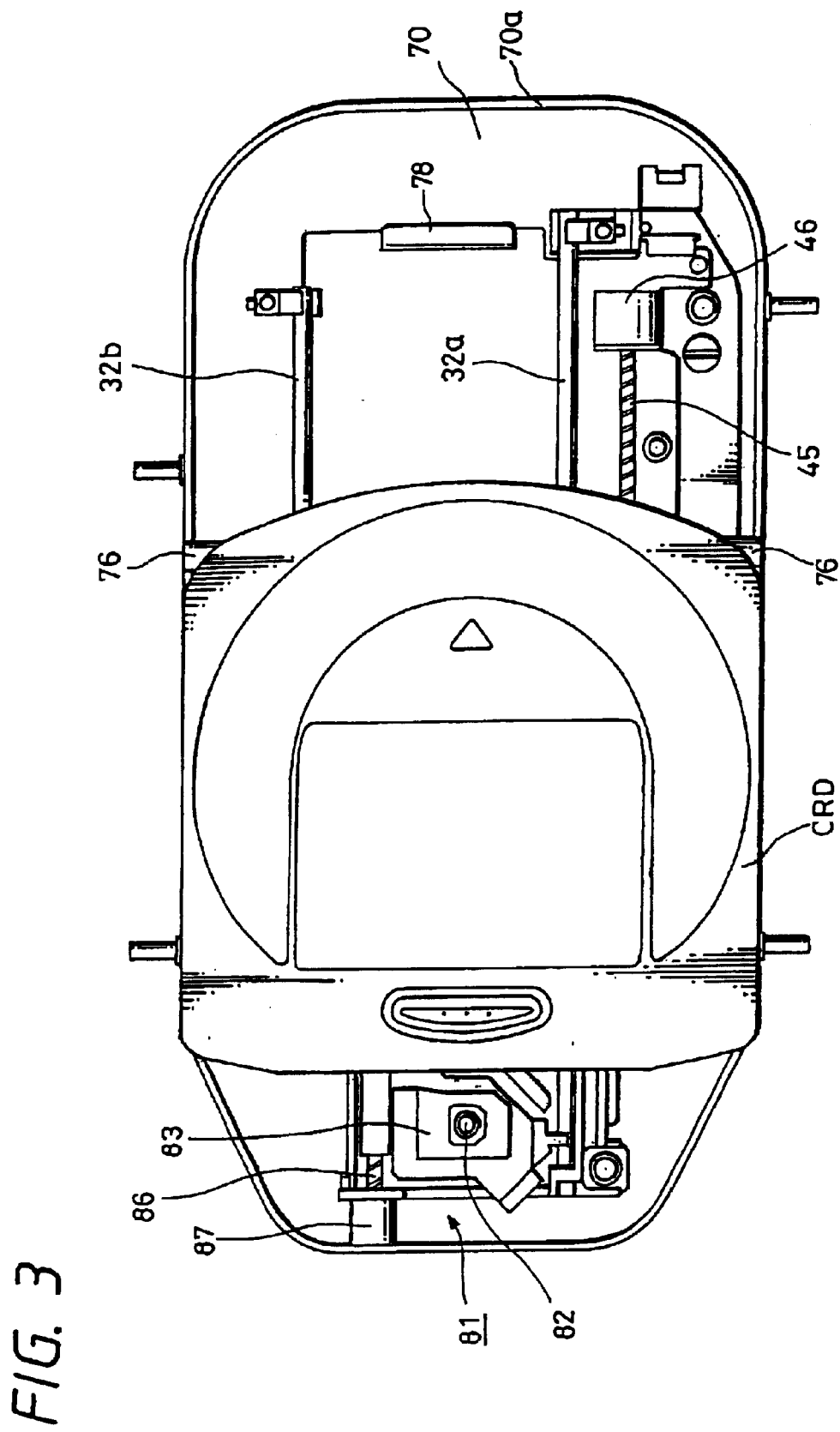
FIG. 3 is a plan view showing a state where a recording medium enclosed in a cartridge has been mounted on a turntable of a recording medium driving apparatus according to an embodiment of the present invention.

FIG. 3 shows a state where an optical disc enclosed in a cartridge CRD has been mounted on the turntable 26 of the optical disc driving apparatus shown in FIGS. 1 and 2. In this case, the second optical head apparatus 81 is in a withdrawn position, and the first optical head apparatus 22 that is not illustrated in FIG. 3 accesses the optical disc enclosed in the cartridge CRD. It should be noted that one example of a construction of the cartridge in which the optical disc is enclosed is described later with reference to FIGS. 5 and 6.

Figure 4:
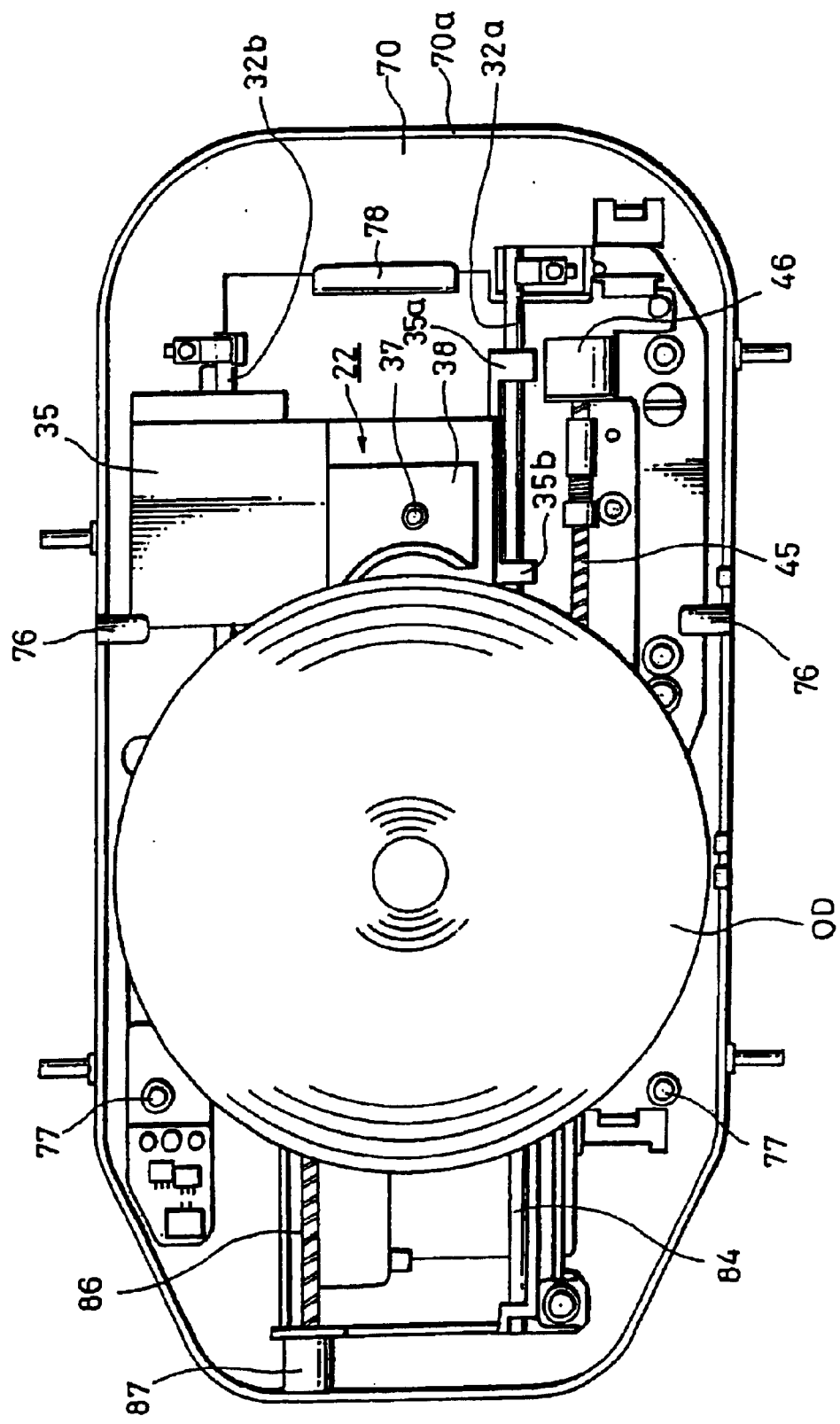
FIG. 4 is a plan view showing a state where a recording medium has been mounted on a turntable of a recording medium driving apparatus according to an embodiment of the present invention.

FIG. 4 shows a state where an optical disc OD with no cartridge has been mounted on the turntable 26 of the optical disc driving apparatus shown in FIGS. 1 and 2. In this case, the first optical head apparatus 22 is in a withdrawn position and the second optical head apparatus 81 that is not illustrated in FIG. 3 accesses the optical disc OD. This optical disc OD is a CD or a DVD.

The recording medium driving apparatus (optical disc driving apparatus) described above has a single turntable but is provided with separate optical head apparatuses (each with a separate linear driving means) that are compatible with recording media of a plurality (for example, two) of different types of recording formats. The recording medium driving apparatus (optical disc driving apparatus) is constructed so that when a recording medium with a format that one of the optical head apparatuses is compatible with is accessed, at least the head part (objective lens) of the other optical head apparatus can be withdrawn from the reflection area of that recording medium. This means that when one of the optical head apparatuses is accessing a recording medium with a compatible format, the other optical head apparatus can be prevented from interfering. There is a decrease in the number of parts, and no space or mechanism is required for moving the other optical head apparatus in the thickness direction, so that a slimline recording medium driving apparatus (optical disc driving apparatus) can be produced.

Figure 5:
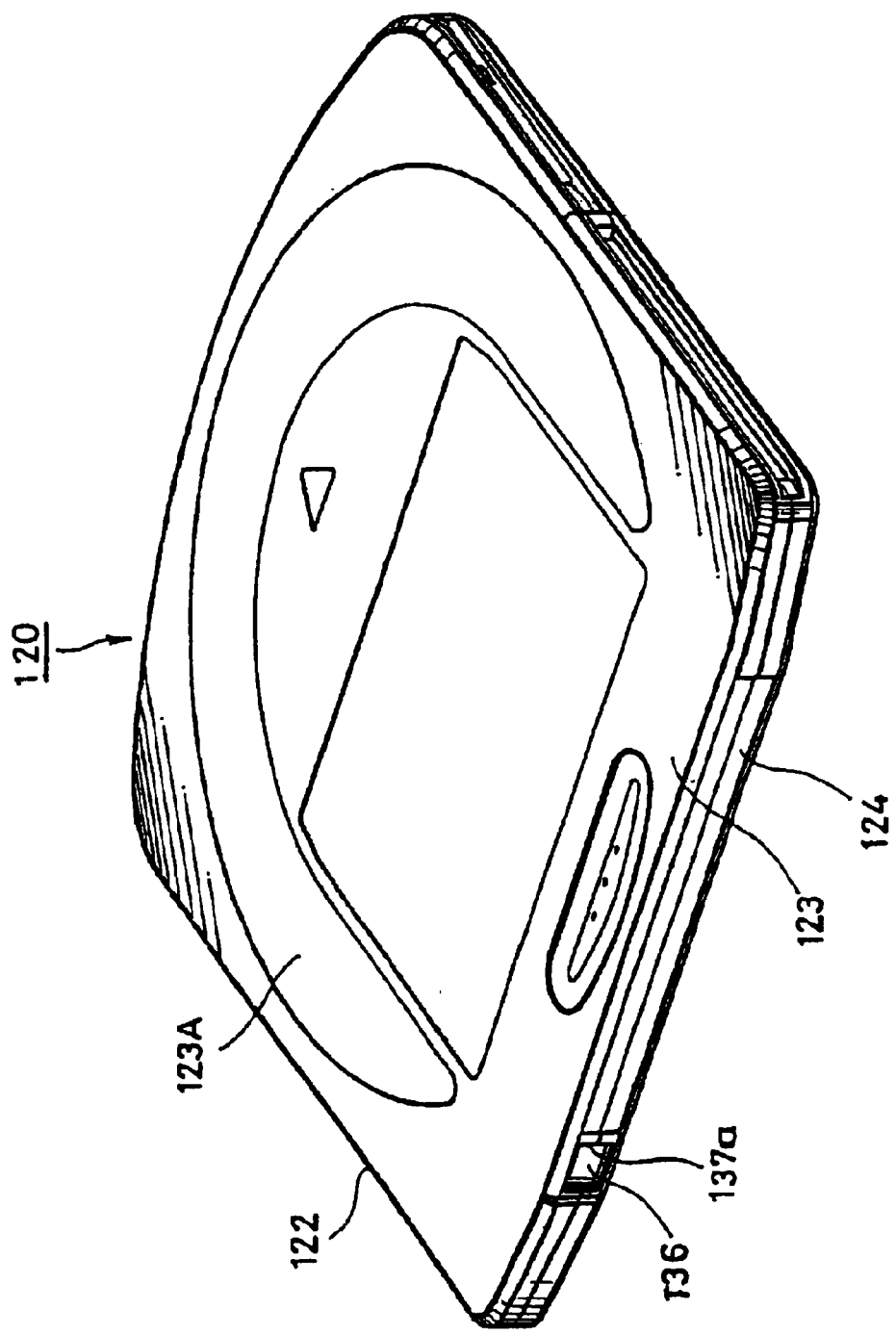
FIG. 5 is a perspective view showing the external appearance of the front of a cartridge in which a recording medium is enclosed.

Next, one example of the construction of the cartridge CRD in which the optical disc is enclosed as shown in FIG. 3 will be described with reference to FIGS. 5 and 6. FIG. 5 is a perspective view showing the external appearance of the front surface side of the cartridge in which the optical disc is enclosed, and FIG. 6 is a perspective view showing the external appearance of the reverse of the cartridge.

Figure 6:
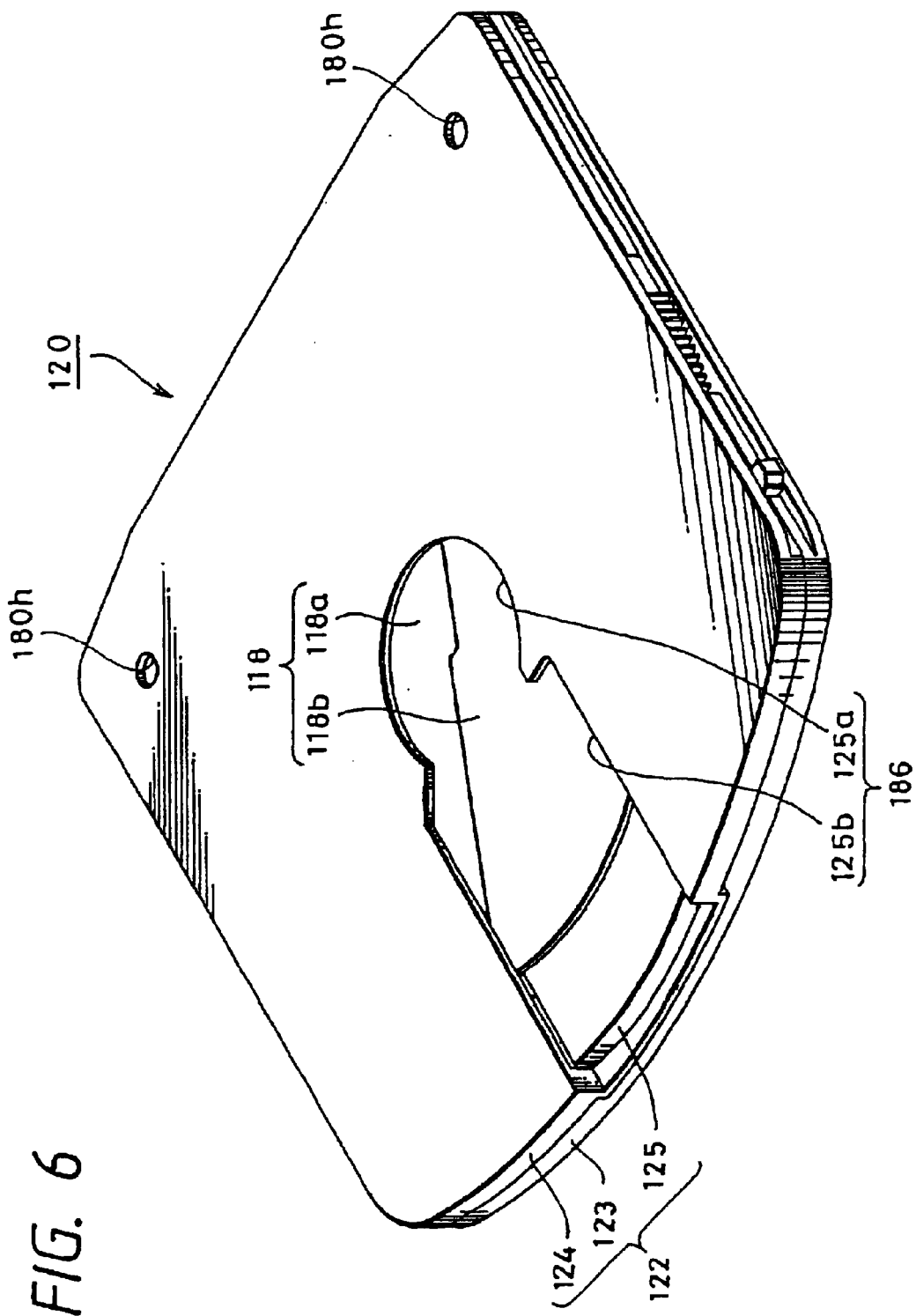
FIG. 6 is a perspective view showing the external appearance of the rear of a cartridge in which a recording medium is enclosed.

In FIGS. 5 and 6, reference numeral 120 denotes a cartridge-housed optical disc. Reference numeral 122 denotes a cartridge case, which is composed of an upper shell 123, a lower shell 124, and a middle shell 125. The optical disc is enclosed within a disc enclosure inside the cartridge case 122 so as to be freely rotatable.

As shown in FIG. 5, the upper shell 123 is formed of two colors using ABS resins of two colors. This is to say, a C-shaped transparent window 123A is formed of clear transparent ABS resin, while the remaining part is formed of ABS resin of a suitable resin. The label surface (not shown in the drawing) of the optical disc in the disc enclosure can be seen through this transparent window 123A.

In FIG. 5, reference numeral 136 denotes a mistaken deletion prevention tag, with this mistaken deletion prevention tag 136 being provided in a prevention tag enclosure and this prevention tag enclosure having an operating window 137a that is open on the reverse surface of the cartridge case 122. The mistaken deletion prevention tag 136 is attached so as to be able to slide to open and close this operating window 137a.

As shown in FIG. 6, an opening 186 in the lower shell 124 is composed of a table opening 125a that is set in the center and into which the turntable 26 can be inserted and a head opening 125b that extends on both sides in the front and back direction of the table opening 125a. The opening 186 faces the information recording surface of the optical disc.

In FIG. 6, reference numeral 118 denotes a shutter mechanism which is composed of a pair of shutter members 118b, 118b. Round holes 180h, 180h are provided in two corners of the lower shell 124. When the cartridge-housed optical disc 120 is mounted on the turntable 26 of the optical disc driving apparatus, these holes 180h, 180h engage cartridge supporting pins 77, 77 of the optical disc driving apparatus of FIGS. 1 and 2 to position the cartridge-housed optical disc 120. It should be noted that when the cartridge-housed optical disc 120 is mounted on the turntable 26 of the optical disc driving apparatus, the surface of the lower shell 124 contacts the bent parts of the cartridge supporting members 76, 76 that are L-shaped in cross-section and are integrally formed with the reinforcing rib 70a of the chassis 70 of the optical disc driving apparatus. The cartridge-housed optical disc 120 is supported by the cartridge supporting pins 77, 77 and cartridge supporting members 76, 76.

The following describes, with reference to FIGS. 7 to 10, the chassis 70, the rotating plate 63, the rotational center determining means 61, the rotational driving means 62, etc., that were shown in FIGS. 1 and 2. A cylindrical pillar 61c, on which a female screw thread is formed, projects upwards from a rectangular embossed part 70d of the chassis 70. This cylindrical pillar 61c passes through a round hole 63a provided in the rotating plate 63 and projects upwards from the rotating plate 63 where it is tightened. A coil spring 61b is fitted onto the circumferential surface of this cylindrical pillar 61c and a stop screw 61a is screwed onto the female thread of the cylindrical pillar 61c so that pressure is applied to the coil spring 61b. In this way, the cylindrical pillar 61c, coil spring 61b, and stop screw 61a construct a rotational center determining means 61 for the rotating plate 63.

An eccentric pin 62a is attached to the chassis 70 by a screw 62b so as to be free to rotate. A groove 62c is formed in the eccentric pin 62a. The tip of a flat screwdriver fits into this groove 62c so that the eccentric pin 62a is rotated by the flat screwdriver. A long hole 63c that engages the circumferential surface of the eccentric pin 62a is formed in the rotating plate 63, and by rotating this eccentric pin 62a, the rotating plate 63 can be rotated by a desired angle. The eccentric pin 62a with the groove 62c and a screw 62b compose the rotational driving means 62.

Figure 9A:
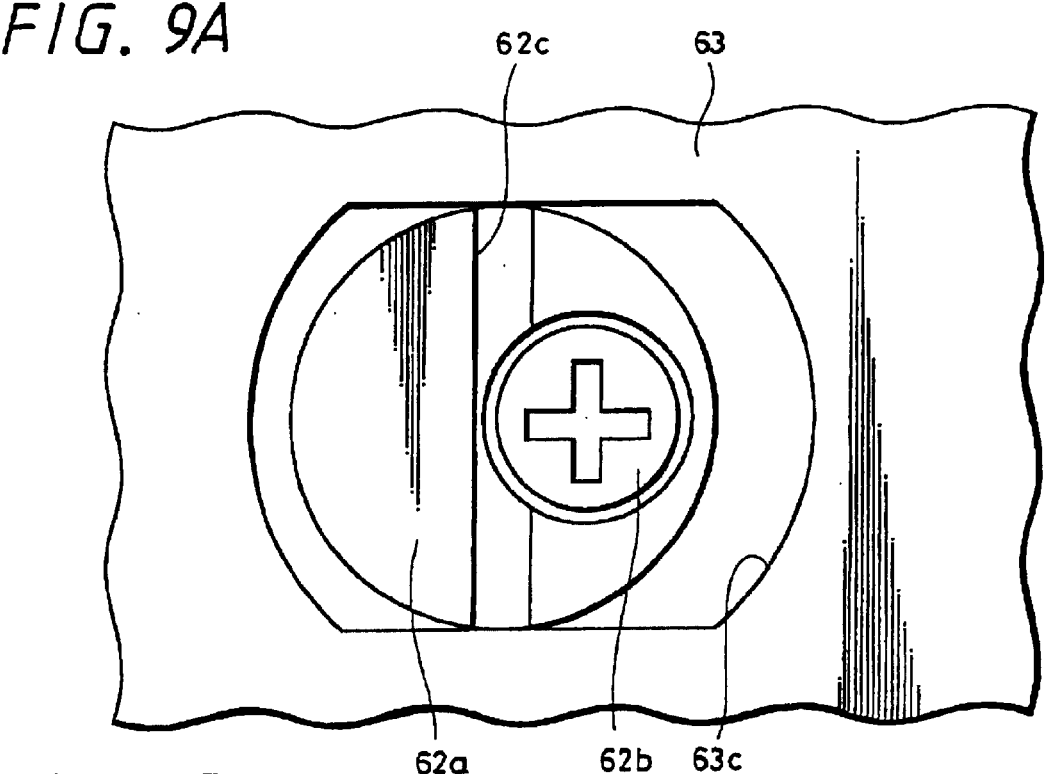
FIG. 9A is a plan view showing a specific example construction of the rotational driving means of the recording medium driving apparatus shown in FIGS. 1 and 2.
Figure 9B:
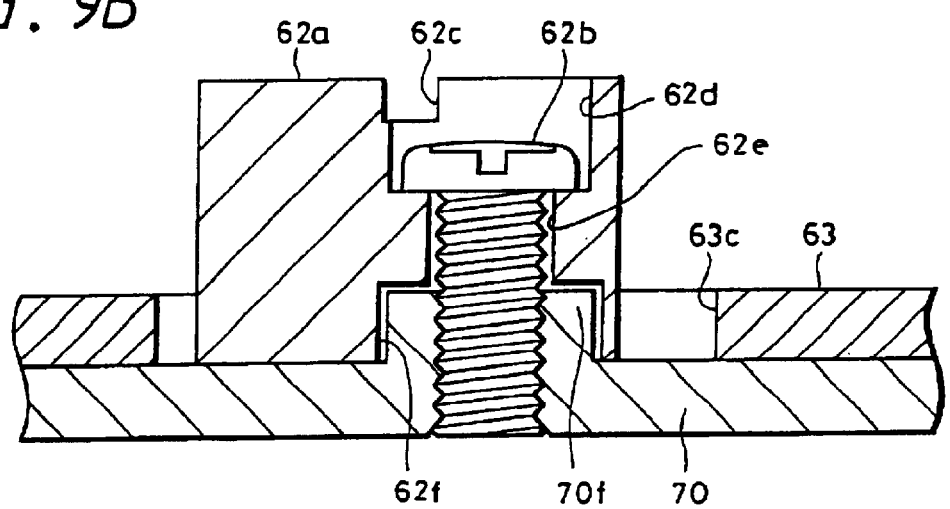
FIG. 9B is a cross-sectional view showing a specific example construction of the rotational driving means of the recording medium driving apparatus shown in FIGS. 1 and 2.
Figure 10A:
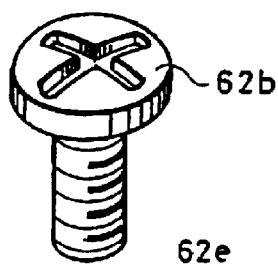
FIGS. 10A to 10D form an exploded perspective view showing a specific example construction of the rotational driving means of the recording medium driving apparatus shown in FIGS. 1 and 2.
Figure 10B:
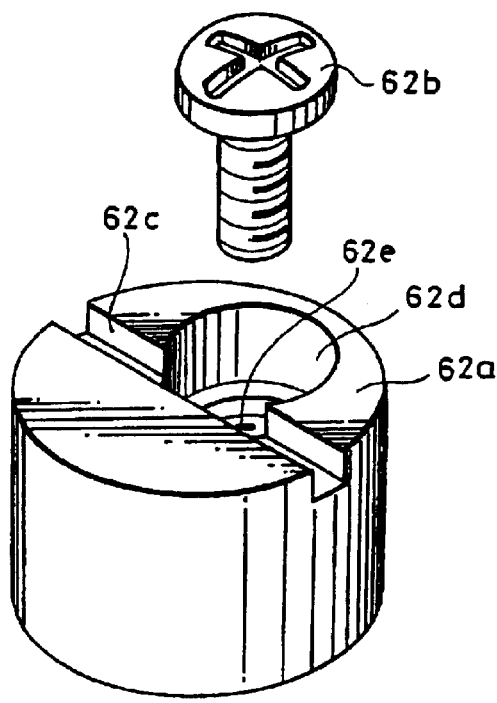
Figure 10C:
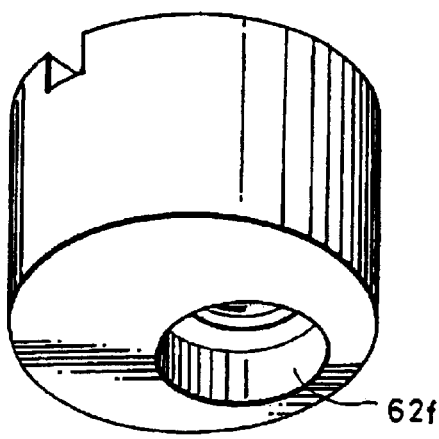
Figure 10D:
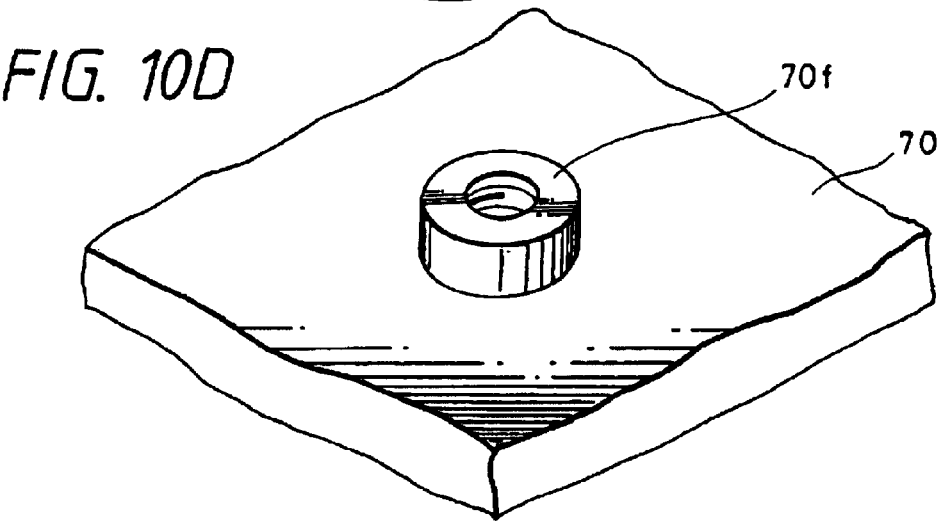

Next, the rotational driving means 62 is described further with reference to FIGS. 9 and 10. A bar ring 70f is integrally formed with the chassis 70. A female screw is formed inside the bar ring 70f, with the bar ring 70f being screwed onto the screw 62b and the eccentric pin 62a being screwed onto the chassis 70 so as to be free to rotate. The eccentric pin 62a has a cylindrical part 62f into which the bar ring 70f is inserted, a cylindrical part 62e through which the screw 62b passes, and a cylindrical part 62d through which the cylindrical parts 62f, 62e pass, in which the head of the screw 62b is enclosed, and that has a larger diameter than the cylindrical part 62e.

Figure 7:
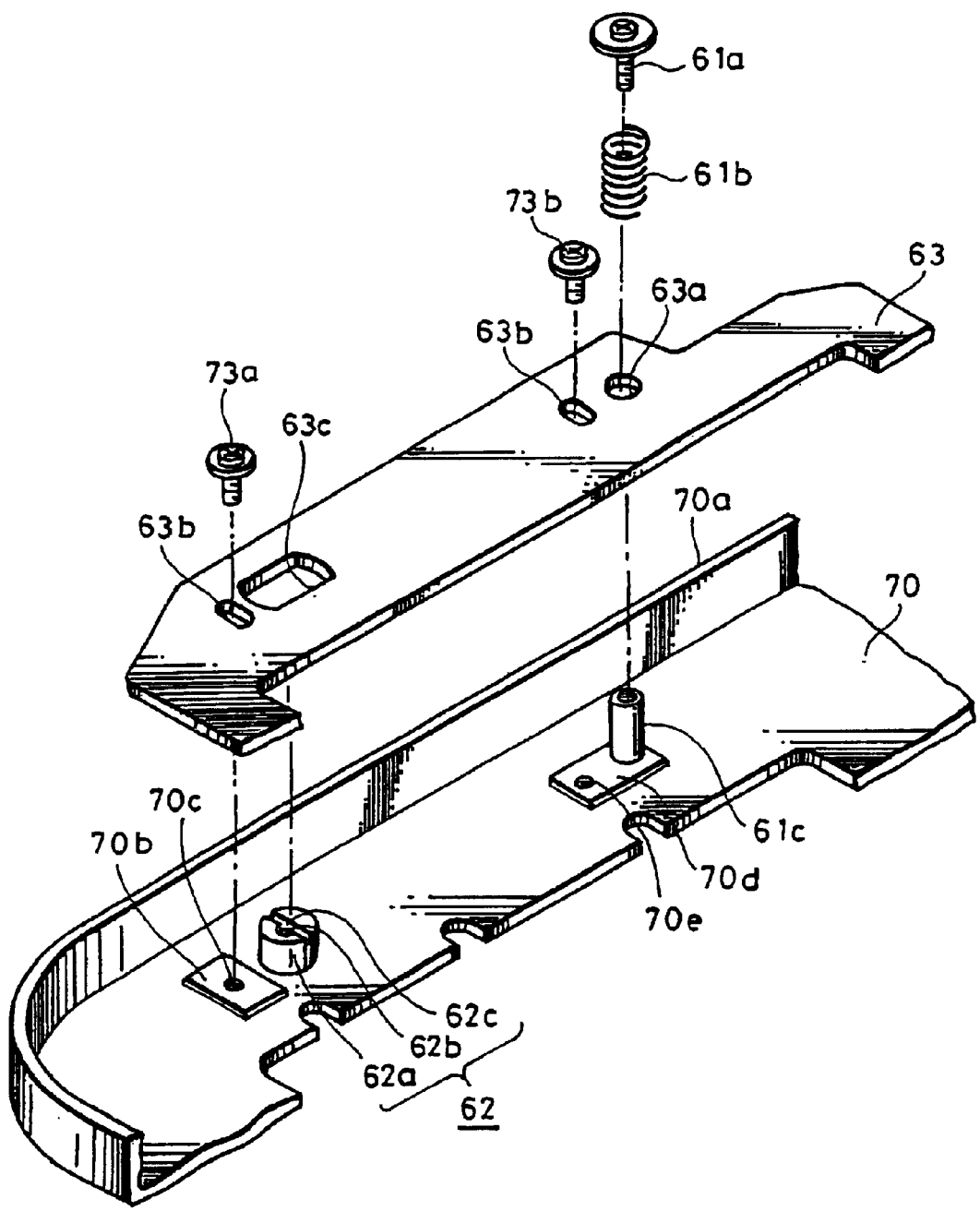
FIG. 7 is an exploded perspective view of part of the recording medium driving apparatus shown in FIGS. 1 and 2.

Next, the following returns to FIGS. 7 and 8 to describe the attachment of the rotating plate 63 to the chassis 70 by the screws 73a, 73b shown in FIGS. 1 and 2. The screws 73a, 73b are passed through long holes 63b, 64d provided in the rotating plate 63 and are screwed respectively onto a female screw thread 70c provided on the rectangular embossed part 70b of, the chassis 70 near the eccentric pin 62a and onto a female screw thread 70e provided on a rectangular embossed part 70d of the chassis 70 where the cylindrical pillar 61c is provided. It should be noted that the major axes of the long holes 63b, 63d approximately follow the rotational direction of the rotating plate 63.

The following returns to FIGS. 1 and 2 to describe the rotation of the rotating plate 63 relative to the chassis 70. In FIGS. 1 and 2, the rotational center determining means 61 is positioned closed to the turntable 26, the rotational driving means 62 is positioned far from the turntable 26, and a straight line that joins the centers of the rotational center determining means 61 and the rotational driving means 62 is approximately parallel to a predetermined radial direction for the central rotational axis of the turntable 26. By using a screwdriver (for example, a flat screwdriver) to rotate the eccentric pin 62a of the rotational driving means 62, the liner movement direction of the first optical head apparatus 22 can be adjusted so as to match a predetermined radial direction for the central rotational axis of the turntable 26. When doing so, the long holes 63b, 63d of the rotating plate 63 move in the longitudinal direction relative to the screws 73a, 73b.

Figure 11:
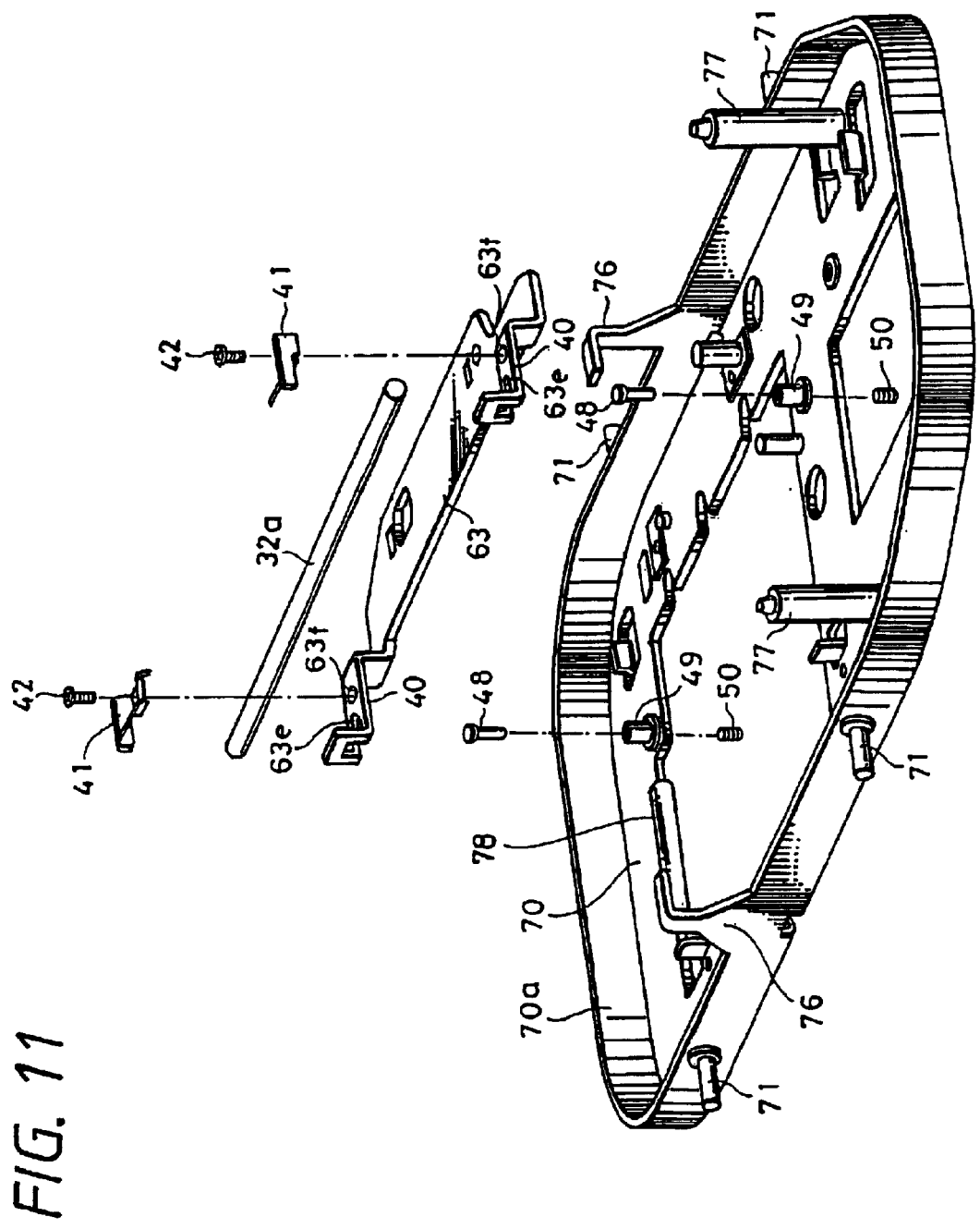
FIG. 11 is an exploded perspective view showing the main guide shaft of the recording medium driving apparatus shown in FIGS. 1 and 2, the parts that are related to the main guide shaft, and the chassis.
Figure 12:
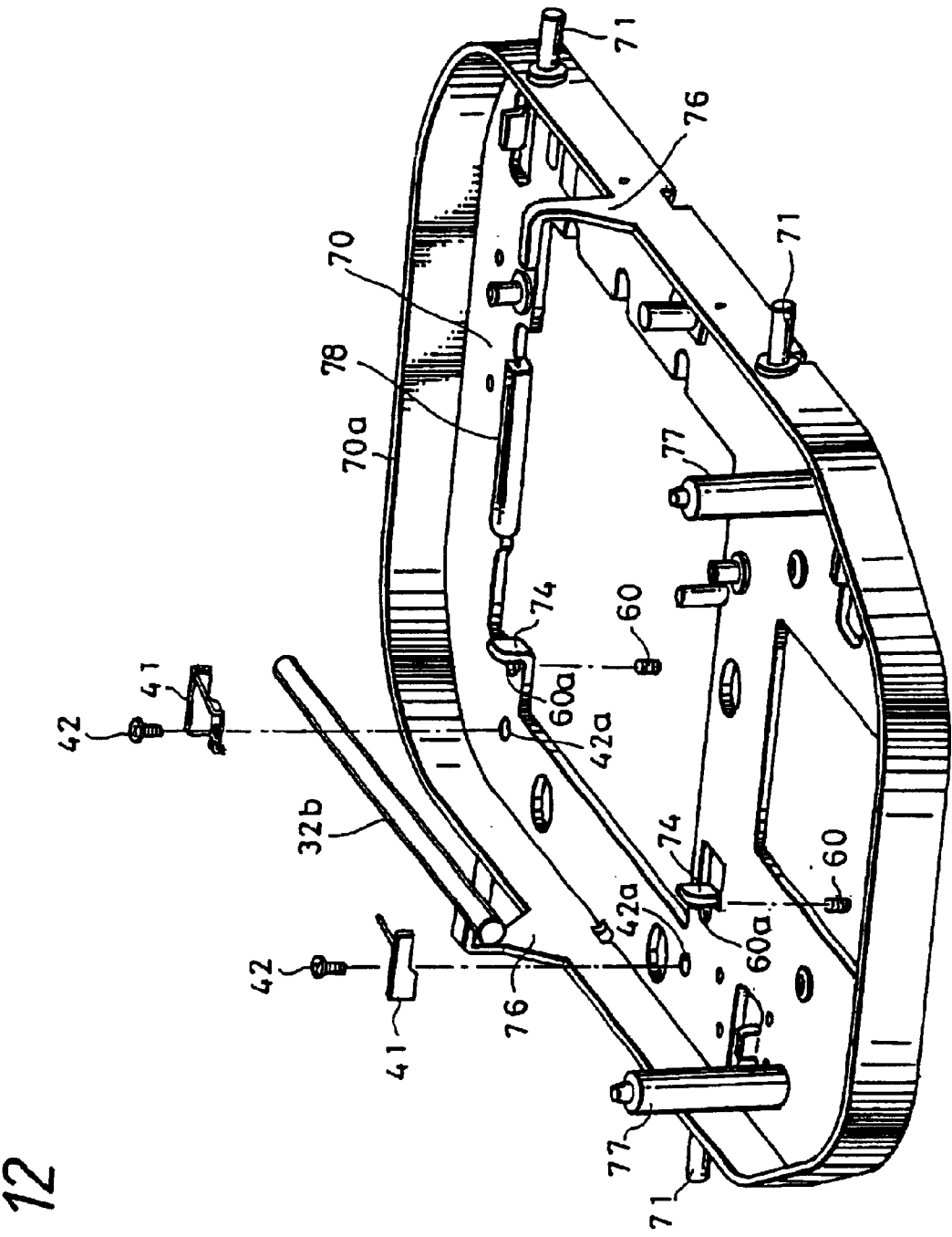
FIG. 12 is an exploded perspective view showing the sub guide shaft of the recording medium driving apparatus shown in FIGS. 1 and 2, the parts that are related to the sub guide shaft, and the chassis.
Figure 13:
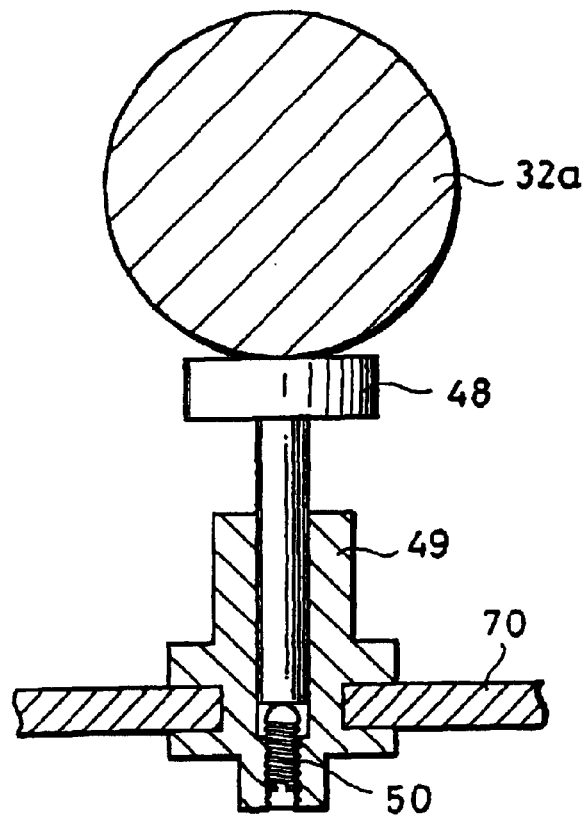
FIG. 13 is a cross-sectional view showing the main guide shaft of FIG. 11 and some of the parts that are related to the main guide shaft.
Figure 14:
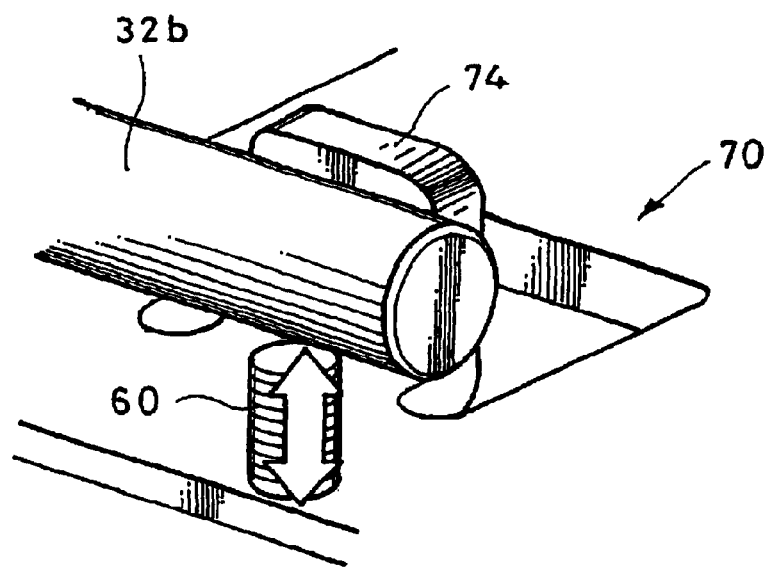
FIG. 14 is a perspective view showing the sub guide shaft of FIG. 12 and some of the parts that are related to the sub guide shaft.

Next, the following describes, with reference to FIGS. 1, 2, 11, 12, 13, and 14, the means for adjusting the height and tilt of the main guide shaft 32a and the sub guide shaft 32b. FIG. 11 is an exploded perspective view showing the main parts that are related to the main guide shaft 32a, while FIG. 12 is an exploded perspective view showing the main parts that are related to the sub guide shaft 32b. FIG. 13 is a cross-sectional view showing the means for adjusting the height of the main guide shaft 32a in detail. FIG. 14 is a cross-sectional view showing the means for adjusting the height of the sub guide shaft 32b in detail.

The following describes the parts related to the main guide shaft 32a, with reference to FIGS. 1, 2, 11, and 13. Both ends of the main guide shaft 32a are attached to the pair of shaft supporting plates 40, 40 of the rotating plate 63 by the shaft pressing plates (plate springs) 41 and the fixing screws 42, 42 that are screwed onto the female screw threads 63f, 63f that are formed in the shaft supporting arms 40, 40. The ends of the shafts 48, 48, that are T-shaped in cross-section, pass through the holes 63e, 63e provided in the shaft supporting arms 40, 40 and are abutted to both ends of the main guide shaft 32a from below as connectors. These shafts 48, 48 are fitted into sleeves that are planted in the chassis 70. Feed screws 50, 50 are screwed into base parts of the sleeves 49, 49, so that the height of shafts 48, 48 can adjusted by adjusting these feed screws 50, 50, which makes it possible to adjust the height of both ends of the main guide shaft 32a and the tilt of the main guide shaft 32a.

The following describes the parts related to the sub guide shaft 32b with reference to FIGS. 1, 2, 12, and 14. Both ends of the sub guide shaft 32b are supported by the shaft support plates 74,74 provided on the chassis 70, the pair of shaft pressing plates (plate springs) 41, 41, and the pair of fixing screws 42, 42. The shaft suspending plates 74, 74 are formed by cutting and raising parts of the chassis 70, and by screwing the shaft pressing plates 41, 41 directly onto the chassis 70 with the screws 42, 42 the sub guide shaft 32b is positioned and fixed at a predetermined position of the chassis 70. Reference numerals 42a, 42a denote female screw threads that are provided in the chassis 70 and into which the fixing screws 42, 42 are screwed. Female screw threads 60a, 60a are also provided near the shaft support plates 74, 74, with feed screws 60, 60 being screwed into these female screw threads 60a, 60a from below the chassis 70 as connectors. The feed screws 60, 60 contact both ends of the sub guide shaft 32b from below, and by rotating the feed screws 60, 60, the height of both ends of the sub guide shaft 32b and the tilt of the sub guide shaft 32b are adjusted.

Figure 15A:
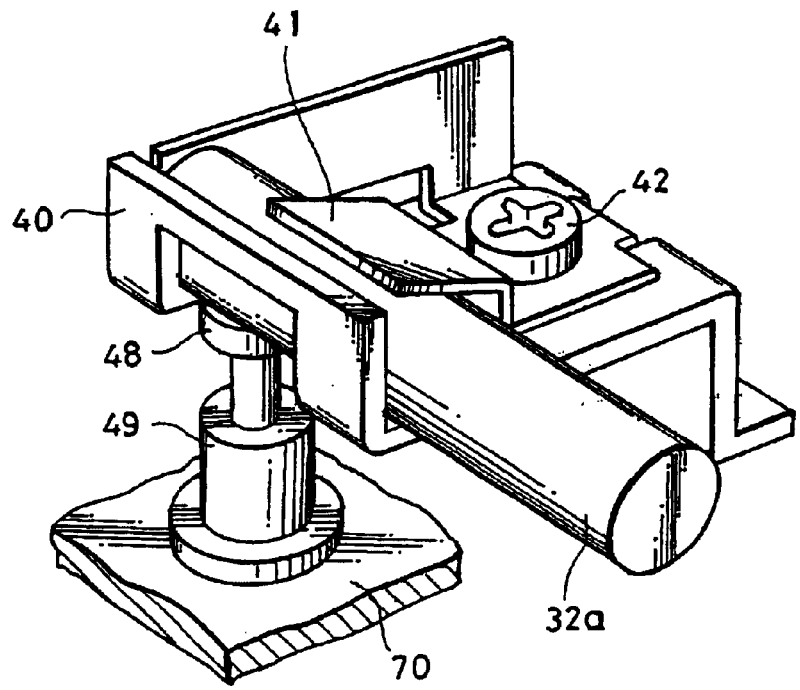
FIG. 15A is a perspective view showing a holding means for the main guide shaft of FIGS. 1 and 2 and a shaft and a sleeve for adjusting the height.

Next, the following further describes the supports (holds) and the height adjustment of the main guide shaft 32a in FIGS. 1 and 2. FIG. 15A is a perspective view showing the shafts and sleeves that serve as the holding means and height adjustment mechanism of the main guide shaft 32a, FIG. 15B is a side view showing the shafts that serve as the holding means and height adjustment mechanism of the main guide shaft 32a, and FIG. 15C is a side view showing the shafts that serve as the height adjustment mechanism in an elevated state.

Figure 15B:
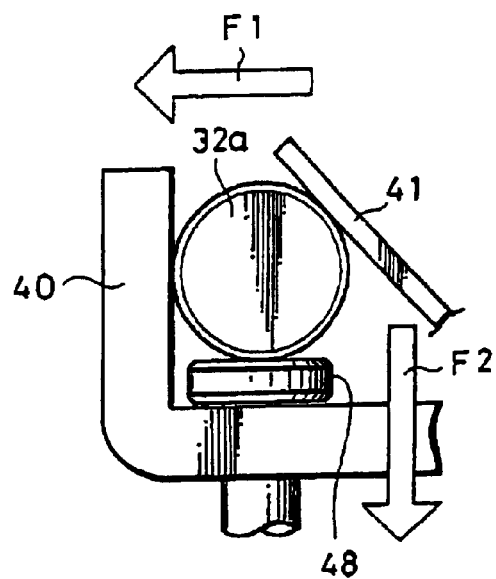
FIG. 15B is a side view showing the holding means for the main guide shaft of FIGS. 1 and 2 and the shaft for adjusting the height.

As shown in FIG. 15B, the shaft pressing plates 41a, which are composed of plate springs, diagonally press on the main guide shaft 32a with respect to the perpendicular raised parts of the shaft support plates 40 and the heads of the shafts 48. In this way, a lateral force F1 and a perpendicular force F2 act on the main guide shaft 32a so that the main guide shaft 32a is stably pressed on the perpendicular raised parts of the shaft support plates 40 and the heads of the shafts 48.

Here, the heads of the shafts 48 are large with respect the other parts of the shafts 48 that support the heads, which increases the range in which an adjustment can be performed in the lateral direction.

Figure 15C:
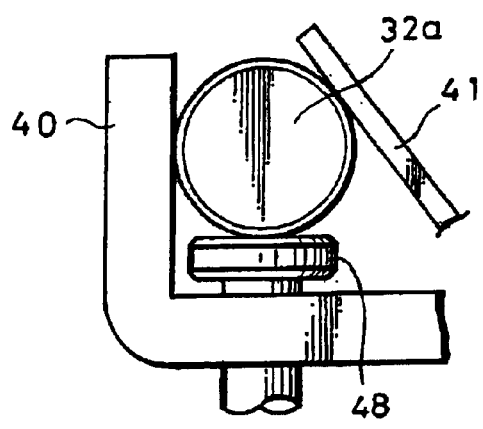
FIG. 15C is a side view showing the holding means for the main guide shaft of FIGS. 1 and 2 and the shaft for adjusting the height, and shows the shaft in an elevated state.

FIG. 15C shows a state where a shaft 48 has been elevated so that the height of the end of the main guide shaft 32a is higher than in the state shown in FIG. 15B.

The following describes, with reference to FIGS. 1, 2, 16, and 17, a parallel driving means 98 for making an adjustment so that a linear driving direction of the optical head driving apparatus 80 which is the linear driving apparatus of the second optical head apparatus 81 to which the optical head attaching member 89 is attached matches a predetermined radial direction with respect to a rotational center axis of the turntable 26.

As was described with reference to FIGS. 1 and 2, the optical head attaching member 89 is screwed onto the chassis 70 by the screws 90a, 90b, and 90c so as to be free to move, so that the direction in which the second optical head apparatus 81 is moved by the optical head driving apparatus 80 as the linear driving means becomes parallel to a predetermined radial direction with respect to a rotational center axis of the turntable 26. A parallel driving means 98 is provided for driving, in concert with a jig, the optical head attaching member 89 relative to the chassis 70 so that the optical head attaching member 89 becomes parallel to a predetermined radial direction with respect to the rotational center axis of the turntable 26, with the parallel driving of the optical head attaching member 89 by the parallel driving means 98 making it possible to adjust the direction in which the second optical head apparatus 81 is moved by the linear driving means so as to match the predetermined radial direction with respect to the rotational center axis of the turntable 26.

The optical head attaching member 89 that is a moving body is driven by the parallel driving means 98 approximately parallel to the direction of movement of the second optical head apparatus 81. The optical head attaching member 89 is screwed onto the chassis 70 by screws 90a, 90b, and 90c at two positions on one side of the feed screw driving apparatus 85 and at one position on the opposite side of the feed screw driving apparatus 85.

The parallel driving means 98 drives the optical head attaching member 89 in concert with an eccentric driver 95 as a jig, so that the optical head attaching member 89 becomes approximately parallel to the direction of movement of the second optical head apparatus 81. The parallel driving means 98 is provided at a position close to where the optical head attaching member 89 is screwed on by the screw 90c, with the parallel movement of the optical head attaching member 89 due to this parallel driving means 98 adjusting the direction of movement of the second optical head apparatus 81 by the optical head driving apparatus 80 so as to match a predetermined radial direction with respect to the rotational center axis of the turntable 26.

The detailed construction of the parallel driving means 98 is described below. A long hole 93 is provided near the screw 90c of the optical head attaching member 89 and a small circular hole 94 is provided in the chassis 70 within this long hole 93. It should be noted that the reference numeral 90w denotes a washer that is used with the screw 90c, and that the washers 90w, 90w are used in the same way with the screws 90a, 90b.

An eccentric pin 95b of the eccentric driver 95 is inserted into the small circular hole 94 of the chassis 70, and by having the eccentric driver 95 rotate while a circumferential surface of a cylindrical part 95a of the eccentric driver 95 abuts the long hole 93 of the chassis 70, the optical head attaching member 89 is made to move parallel with respect to the chassis 70.

The screws 90a, 90b, and 90c are positioned at the vertices of a triangle, with the screw 90c being positioned approximately equidistantly from the positions of the screws 90a and 90b, so that the triangle is an approximately isosceles triangle. As shown in FIG. 17, the screw holes in the chassis 70 for the screws 90a, 90b, and 90c of the optical head attaching member 89, are long holes numbered 100a, 100b, and 100c, with the longitudinal directions of these long holes 100a, 100b, and 100c matching the direction of the parallel movement of the optical head attaching member 89 that is caused by the rotation of the eccentric driver 95. It should be noted that reference numeral 100d denotes a rectangular hole that is provided on the inside of the long holes 100a, 100b, and 100c of the chassis 70.

In the above embodiment, a case where the present invention has been applied to a combination of an optical disc and an optical disc apparatus is described, though this is not a limitation for the present invention. It should be obvious that the present invention can be applied to a combination with a recording medium, such as a magnetic-optical disc, a magnetic disc, and a static storage disc, and a head apparatus that performs reproduction and/or recording for such a recording medium.

Also, the present invention is provided with a plurality of head apparatuses, which correspond to a plurality of types of recording media of different formats, for a shared turntable, so that the recording method can be selected from a variety of types. Also, this plurality of types of recording media may be a variety of types of exposed discs with different recording methods or a variety of types of discs that are enclosed in cartridges and use different recording methods or have cartridges of different shapes.

According to the present invention, a recording medium driving apparatus includes at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus further including: a chassis; a rotating plate that is rotatably disposed on the chassis; rotational center determining means for determining a rotational center of the rotating plate with respect to the chassis; and rotational driving means for driving the rotating plate around the rotational center, wherein at least part of the linear driving means is fixed to the rotating plate, and the rotational driving means rotates the rotating plate so that a direction in which the head apparatus is moved by the linear driving means is adjusted to match a predetermined radial direction with respect to a rotational center axis of the turntable. This makes it possible to provide a recording medium driving apparatus in which the position of the linear driving means with respect to the turntable can be adjusted at high precision so that the direction in which the head apparatus is moved by the linear driving means matches a predetermined radial direction with respect to a rotational center axis of the turntable.

Also according to the present invention, the rotational driving means may be composed of an eccentric pin that is attached to the chassis so as to be free to rotate and a long hole that is provided in the rotating plate, with the eccentric pin rotating in a state where the eccentric pin abuts the long hole so that the rotating plate is rotated by a desired angle. This makes it possible to provide a recording medium driving apparatus where the position of the linear driving means with respect to the turntable can be stably maintained.

Also according to the present invention, the linear driving means may include at least a feed screw, a motor that drives the feed screw, a nut that is screwed onto the feed screw and is connected to the head apparatus, a main guide shaft on which a slider on which the head apparatus is mounted slides, and a sub guide shaft which is provided on the chassis and on which the slider slides. This makes it possible to provide a recording medium driving apparatus where the position of the linear driving means with respect to the turntable can be easily adjusted.

Also according to the present invention, the heights of both end parts of the main guide shaft and of the sub guide shaft may be adjusted by height-adjusting contacts that contact both end parts of the main guide shaft and of the sub guide shaft, and a height and a tilting of the main guide shaft and of the sub guide shaft may be adjusted by a height adjustment of the height-adjusting contacts. This makes it possible to provide a recording medium driving apparatus where the height and tilt of each of the main guide shaft and the sub guide shaft can be adjusted with high precision.

Also, according to the present invention, positions of both end parts of the main guide shaft and of the sub guide shaft in a vertical direction and a horizontal direction may be determined by supports that are L-shaped in cross-section and plate springs. This makes it possible to provide a recording medium driving apparatus where the height and tilt of each of the main guide shaft and the sub guide shaft that have been adjusted can be stably maintained.

Also, according to the present invention, the height-adjusting contacts for both ends of the main guide shaft may be each composed of a shaft that contacts one end of the main guide shaft, a sleeve that is attached to the chassis so as to support the shaft, and a feed screw that is screwed into a base of the sleeve and abuts a lower end of the shaft, and the supports that support each end of the main guide shaft may be composed of arm-like shaft supporting plates that are attached to the rotating plate. This makes it possible to provide a recording medium driving apparatus that is resistant to vibration and shocks in the height direction of the main guide shaft and where the height of the main guide shaft can be maintained even when the main guide shaft is detached and then reattached.

Also, according to the present invention, a recording medium driving apparatus includes at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus further including: a chassis; a moving body on which the head apparatus and the linear driving means are mounted, the moving body being screwed onto the chassis in a movable state so that a direction in which the head apparatus is moved by the linear driving means becomes parallel with a predetermined radial direction with respect to a rotational center axis of the turntable; and parallel driving means for driving, in concert with a jig and with respect to the chassis, the moving body parallel with respect to a predetermined radial direction with respect to a rotational center axis of the turntable, wherein parallel movement of the moving body by the parallel driving means adjusts the direction in which the head apparatus is moved by the linear driving means so as to match the predetermined radial direction with respect to the rotational center axis of the turntable. This makes it possible to provide a recording medium driving apparatus in which the position of the linear driving means with respect to the turntable can be easily adjusted by a simple construction so that the direction in which the head apparatus is moved by the linear driving means matches a predetermined radial direction with respect to a rotational center axis of the turntable.

Also, according to the present invention, the moving body may be screwed onto the chassis in a movable state at two positions on one side of the linear driving means and at one position on an opposite side of the linear driving means, and the parallel driving means may be disposed in a vicinity of the screw position on the opposite side of the linear driving means. This makes it possible to provide a recording medium driving apparatus in which the position of the linear driving means with respect to the turntable can be easily adjusted by a simple construction.

Also, according to the present invention, the parallel driving means may be composed of a long hole provided in a contact part of the moving body where the moving body contacts the chassis and a circular hole that is provided in the chassis within the long hole, wherein the jig may be an eccentric driver composed of a cylindrical part that abuts an inner circumference of the long hole and an eccentric pin that is provided at a position that is off-center with respect to the cylindrical part and is inserted into the circular hole. This makes it possible to provide a recording medium driving apparatus in which the position of the linear driving means with respect to the turntable can be easily adjusted by an extremely simple construction.

What is claimed is:

1. A recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus comprising:
    a chassis;
    a rotating plate that is rotatably disposed on the chassis;
    rotational center determining means for determining a rotational center of the rotating plate with respect to the chassis; and
    rotational driving means for driving the rotating plate around the rotational center;
    wherein at least part of the linear driving means is fixed to the rotating plate, and the rotational driving means rotates the rotating plate so that a direction in which the head apparatus is moved by the linear driving means is adjusted to match a predetermined radial direction with respect to a rotational center axis of the turntable;
    wherein the rotational driving means is composed of an eccentric pin that is attached to the chassis so as to be free to rotate and a long hole that is provided in the rotating plate; and
    wherein the eccentric pin rotates in a state where the eccentric pin abuts the long hole so that the rotating plate is rotated by a desired angle.

2. The recording medium driving apparatus according to claim 1,
    wherein the linear driving means includes at least a feed screw, a motor that drives the feed screw, a nut that is screwed onto the feed screw and is connected to the head apparatus, a main guide shaft on which a slider on which the head apparatus is mounted slides, and a sub guide shaft which is provided on the chassis and on which the slider slides.

3. The recording medium driving apparatus according to claim 2,
    wherein heights of both end parts of the main guide shaft and of the sub guide shaft are adjusted by height-adjusting contacts that contact both end parts of the main guide shaft and of the sub guide shaft, and
    a height and a tilting of the main guide shaft and of the sub guide shaft are adjusted by a height adjustment of the height-adjusting contacts.

4. The recording medium driving apparatus according to claim 3,
    wherein positions of both end parts of the main guide shaft and of the sub guide shaft in a vertical direction and a horizontal direction are determined by supports that are L-shaped in cross-section and plate springs.

5. A recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus comprising:
    a chassis;
    a rotating plate that is rotatably disposed on the chassis;
    a rotational center determining means for determining a rotational center of the rotating plate with respect to the chassis; and
    a rotational driving means for driving the rotating plate around the rotational center;
    wherein at least part of the linear driving means is fixed to the rotating plate, and the rotational driving means rotates the rotating plate so that a direction in which the head apparatus is moved by the linear driving means is adjusted to match a predetermined radial direction with respect to a rotational center axis of the turntable;
    wherein the linear driving means includes at least a feed screw, a motor that drives the feed screw, a nut that is screwed onto the feed screw and is connected to the head apparatus, a main guide shaft on which a slider on which the head apparatus is mounted slides, and a sub guide shaft which is provided on the chassis and on which the slider slides;
    wherein heights of both end parts of the main guide shaft and of the sub guide shaft are adjusted by height-adjusting contacts that contact both end parts of the main guide shaft and of the sub guide shaft;
    wherein a height and a tilting of the main guide shaft and of the sub guide shaft are adjusted by a height adjustment of the height-adjusting contacts;

wherein the height-adjusting contacts for both ends of the main guide shaft are each composed of a shaft that contacts one end of the main guide shaft, a sleeve that is attached to the chassis so as to support the shaft, and a feed screw that is screwed into a base of the sleeve and abuts a lower end of the shaft; and wherein the supports that support each end of the main guide shaft are composed of arm-like shaft supporting plates that are attached to the rotating plate.

6. A recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the recording medium driving apparatus comprising:

a chassis;

a moving body on which the head apparatus and the linear driving means are mounted, the moving body being screwed onto the chassis in a movable state so that a direction in which the head apparatus is moved by the linear driving means becomes parallel with a predetermined radial direction with respect to a rotational center axis of the turntable; and parallel driving means for driving, in concert with a jig and with respect to the chassis, the moving body parallel with respect to a predetermined radial direction with respect to a rotational center axis of the turntable;

wherein parallel movement of the moving body by the parallel driving means adjusts the direction in which the head apparatus is moved by the linear driving means so as to match the predetermined radial direction with respect to the rotational center axis of the turntable;

wherein the moving body is screwed onto the chassis in a movable state at two positions on one side of the linear driving means and at one position on an opposite side of the linear driving means;

wherein the parallel driving means is disposed in a vicinity of the screw position on the opposite side of the linear driving means and is composed of a long hole provided in a contact part of the moving body where the moving body contacts the chassis and a circular hole that is provided in the chassis within the long hole; and wherein the jig is an eccentric driver composed of a cylindrical part that abuts an inner circumference of the long hole and an eccentric pin that is provided at a position that is off-center with respect to the cylindrical part and is inserted into the circular hole.

* * * * *